US011681673B1

(12) United States Patent
Fritz et al.

(10) Patent No.: US 11,681,673 B1
(45) Date of Patent: *Jun. 20, 2023

(54) APPARATUS AND METHOD FOR DATA OBJECT GENERATION AND CONTROL

(71) Applicant: Groupon, Inc., Chicago, IL (US)

(72) Inventors: Kyle Fritz, Baltimore, MD (US); Nicholas Pellegrini, Baltimore, MD (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,693

(22) Filed: Jul. 8, 2021

Related U.S. Application Data

(63) Continuation of application No. 16/526,395, filed on Jul. 30, 2019, now Pat. No. 11,100,067, which is a continuation of application No. 15/280,246, filed on Sep. 29, 2016, now Pat. No. 10,409,792.

(60) Provisional application No. 62/235,338, filed on Sep. 30, 2015.

(51) Int. Cl.
| | |
|---|---|
| *G06F 3/0481* | (2022.01) |
| *G06F 16/22* | (2019.01) |
| *G06F 40/186* | (2020.01) |
| *G06F 3/0484* | (2022.01) |
| *G06F 40/194* | (2020.01) |
| *G06F 9/451* | (2018.01) |
| *G06F 3/0482* | (2013.01) |
| *G06F 8/38* | (2018.01) |

(52) U.S. Cl.
CPC ............ *G06F 16/22* (2019.01); *G06F 3/0481* (2013.01); *G06F 3/0484* (2013.01); *G06F 40/186* (2020.01); *G06F 40/194* (2020.01); *G06F 3/0482* (2013.01); *G06F 8/38* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 6,748,569 B1 * | 6/2004 | Brooke | ................. | G06F 40/154 |
| | | | | 707/999.001 |
| 6,920,607 B1 * | 7/2005 | Ali | ........................ | G06F 16/88 |
| | | | | 709/219 |
| 7,512,899 B1 * | 3/2009 | Hoiem | .................... | G06F 9/451 |
| | | | | 715/825 |
| 7,636,722 B2 * | 12/2009 | Bunkerr | .............. | G06F 9/44526 |
| 8,370,751 B2 * | 2/2013 | Graeff | ....................... | G06F 8/38 |
| | | | | 715/744 |

(Continued)

*Primary Examiner* — Tuyetlien T Tran
(74) *Attorney, Agent, or Firm* — Alston & Bird LLP

(57) ABSTRACT

An apparatus, method, and computer program product are provided to generate, transform, and control menu data object in network environment. In some example implementations, menu data objects and related parameters are parsed and translated into a stratified data structure that can be used in connection with creating a renderable object associated with an interactive user interface accessible via a mobile system associated with a user. Control over the menu data object and its associated interface can be automated, and/or implemented in a manner that detects interrelated elements of the data structure such that alterations made to one element cause the related elements to be rendered in an alternate manner for visual verification.

20 Claims, 6 Drawing Sheets

(56) References Cited

U.S. PATENT DOCUMENTS

| | | | | |
|---|---|---|---|---|
| 10,163,156 | B1* | 12/2018 | Shapley | G06Q 40/025 |
| 2003/0043192 | A1* | 3/2003 | Bouleau | G06F 9/541 |
| | | | | 715/762 |
| 2004/0027390 | A1* | 2/2004 | Yamato | G06F 9/451 |
| | | | | 715/806 |
| 2004/0194069 | A1* | 9/2004 | Surasinghe | G06F 8/427 |
| | | | | 717/136 |
| 2005/0071171 | A1* | 3/2005 | Dvorak | G10L 15/28 |
| | | | | 704/275 |
| 2005/0160159 | A1* | 7/2005 | Zimmer | G06F 15/177 |
| | | | | 709/223 |
| 2005/0240902 | A1* | 10/2005 | Bunker | G06F 9/44526 |
| | | | | 717/109 |
| 2006/0098944 | A1* | 5/2006 | Kobayashi | H04N 9/8042 |
| 2006/0190569 | A1* | 8/2006 | Neil | H04W 48/08 |
| | | | | 709/220 |
| 2007/0226064 | A1* | 9/2007 | Yu | G06Q 20/201 |
| | | | | 705/37 |
| 2007/0244926 | A1* | 10/2007 | Vitanov | G06F 9/451 |
| 2007/0271521 | A1* | 11/2007 | Harriger | G06F 9/451 |
| | | | | 707/999.102 |
| 2008/0016187 | A1* | 1/2008 | Neil | G06F 9/451 |
| | | | | 709/220 |
| 2008/0020737 | A1* | 1/2008 | Neil | G06F 9/44505 |
| | | | | 455/414.1 |
| 2008/0320400 | A1* | 12/2008 | Smith | G06F 3/0484 |
| | | | | 715/810 |
| 2009/0063988 | A1* | 3/2009 | Graeff | G06F 8/38 |
| | | | | 715/744 |
| 2009/0282019 | A1* | 11/2009 | Galitsky | G06F 40/30 |
| | | | | 707/999.005 |
| 2011/0035435 | A1* | 2/2011 | Meng | G06F 9/54 |
| | | | | 709/203 |
| 2011/0252073 | A1* | 10/2011 | Pauly | G06F 16/213 |
| | | | | 707/812 |
| 2012/0177031 | A1* | 7/2012 | Rose | H04L 12/66 |
| | | | | 370/352 |
| 2012/0188574 | A1* | 7/2012 | Armstrong | G06F 3/1285 |
| | | | | 358/1.13 |
| 2012/0227000 | A1* | 9/2012 | McCoy | G06F 3/0482 |
| | | | | 715/762 |
| 2012/0254801 | A1* | 10/2012 | Gaffney | G06F 8/38 |
| | | | | 715/825 |
| 2012/0311471 | A1* | 12/2012 | Bullard | G06F 11/3664 |
| | | | | 715/764 |
| 2012/0324053 | A1* | 12/2012 | Tian | H04L 67/34 |
| | | | | 709/217 |
| 2013/0074010 | A1* | 3/2013 | Zhao | H04M 1/72469 |
| | | | | 715/810 |
| 2014/0040840 | A1* | 2/2014 | Hysong | G06F 30/00 |
| | | | | 716/106 |
| 2014/0047359 | A1* | 2/2014 | Teigene | G06F 16/951 |
| | | | | 715/760 |
| 2014/0181788 | A1* | 6/2014 | Sullivan | G06F 9/451 |
| | | | | 717/109 |
| 2014/0207584 | A1* | 7/2014 | Wicha | G06Q 30/0276 |
| | | | | 705/14.72 |
| 2016/0098261 | A1* | 4/2016 | Habib | G06F 9/454 |
| | | | | 717/171 |
| 2016/0350609 | A1* | 12/2016 | Mason | G06T 15/20 |

* cited by examiner

APPARATUS AND METHOD FOR DATA OBJECT GENERATION AND CONTROL

CROSS-REFERENCE TO RELATED APPLICATIONS

The present application claims is a continuation of U.S. patent application Ser. No. 16/526,395, titled "Apparatus And Method For Data Object Generation And Control," filed Jul. 30, 2019, which is a continuation of U.S. patent application Ser. No. 15/280,246, titled "Apparatus And Method For Data Object Generation And Control," filed Sep. 29, 2016, now U.S. Pat. No. 10,409,792 issued Sep. 10, 2019, which claims the benefit of U.S. Provisional Patent Application Ser. No. 62/235,338, titled "Method And Apparatus For Data Object Generation," filed on Sep. 30, 2015, the entire contents of each of which are incorporated by reference herein.

TECHNICAL FIELD

An example embodiment relates generally to systems that allow for the generation and control of menu data objects in an efficient manner. Example implementations are particularly directed to systems, methods, and apparatuses for generating menu data objects conforming to a stratified data structure and creating client interfaces associated with the generated menu data object based on the stratified data structure and related templates and adjustment factors to allow for the modification and/or other control of the menu data object.

BACKGROUND

Many users of mobile devices now rely heavily on the use of such mobile devices to interface with remote systems to perform complex and highly particularized computing functions. As a result, many system interfaces involve dense, complex menu structures that can present options and other information to the user, accept input from the user, and responsively present additional options and other information to the user. As the size, complexity, and adoption of such menu structures has grown, so too have the technical challenges associated with generating and controlling menu data object and related interfaces.

Such challenges are compounded in implementations that arise in contexts where the options and/or other information need to be updated, particularly when a particular menu structure features multiple instances of similar options and/or other information, or permits similar options and/or other information to be accessed via multiple pathways through the menu structure. As a result, there is a need to resolve these and other technical challenges to allow for the efficient generation and control of menu data objects and interfaces related thereto.

BRIEF SUMMARY

An apparatus, computer program product, and method are therefore provided in accordance with an example embodiment in order permit the efficient generation, processing, and updating of menu data objects and related interfaces. In this regard, the method, apparatus and computer program product of an example embodiment provide for the creation of renderable object data through the parsing and other processing of received menu object data information, including the storage of such menu object data information in a stratified data structure. Moreover, the method, apparatus, and computer program product of an example embodiment provide for the iteration and/or updating of the renderable object data based on subsequent sets of menu data object information and/or other input received from the mobile device.

In an example embodiment, an apparatus is provided, the apparatus comprising a processor and a memory, the memory comprising instructions that configure the apparatus to: receive a first set of menu data object information, wherein the first set of menu data object information comprises: a set of location data associated with a menu data object, an item identification, and a group identification; parse the received first set of menu data object data information to generate a first set of parsed menu data object information; store the first set of parsed menu data object information in a stratified data structure to create a populated stratified data structure; flatten the populated stratified data structure to create a first set of renderable object data; transmit a control signal that causes the first set of renderable object data to be presented to a user via a user interface; receive a second set of menu data object information, wherein the second set of menu data object information comprises a set of updated menu data object information; parse the received second set of menu data objection information to generate a second set of parsed menu data object information; determine a difference between the first set of parsed menu data object information and the second set of parsed menu data object information; repopulate the populated stratified data structure based at least in part on the determined difference between the first set of parsed menu data object information and the second set of parsed menu data object information; create a second set of renderable object data; and transmit a control signal that causes the second set of renderable object data to be presented to the user via the user interface.

In some example implementations of such an apparatus, the memory comprises further instructions that configure the apparatus to parse the first set of menu data object information by: recognizing a first subset of menu data object information and a second subset of menu data object information; and storing the first subset of menu data object information separately from the second subset of menu data object information. In some such example implementations, and in other example implementations, the memory comprises further instructions that configure the apparatus to: detect a relationship between a first portion and a second portion of the first set of parsed menu data object information; and store an indication of the relationship in the populated stratified data structure. In some such example implementations, and in other example implementations, flattening the populated stratified data structure to create the first set of renderable object data further comprises preserving the populated stratified data structure.

In some example implementations of such an apparatus, the memory comprises further instructions that configure the apparatus to receive input data via the user interface and store the input data in the populated stratified data structure. In some such example implementations, and in other example implementations, the memory comprises further instructions that configure the apparatus to traverse the stratified data structure to determine an override condition associated with the input data and transmit a control signal that causes an indication of the override condition to be rendered on the user interface.

In some example implementations storing the first set of parsed menu data object information in a stratified data structure comprises populating an option group, wherein the option group is established at a top level of the stratified data structure.

In another example embodiment, a computer program product is provided, the computer program product comprising at least one non-transitory computer-readable storage medium having computer-executable program code instructions stored therein, the computer-executable program code instructions comprising program code instructions configured to: receive a first set of menu data object information, wherein the first set of menu data object information comprises: a set of location data associated with a menu data object, an item identification, and a group identification; parse the received first set of menu data object data information to generate a first set of parsed menu data object information; store the first set of parsed menu data object information in a stratified data structure to create a populated stratified data structure; flatten the populated stratified data structure to create a first set of renderable object data; transmit a control signal that causes the first set of renderable object data to be presented to a user via a user interface; receive a second set of menu data object information, wherein the second set of menu data object information comprises a set of updated menu data object information; parse the received second set of menu data objection information to generate a second set of parsed menu data object information; determine a difference between the first set of parsed menu data object information and the second set of parsed menu data object information; repopulate the populated stratified data structure based at least in part on the determined difference between the first set of parsed menu data object information and the second set of parsed menu data object information; create a second set of renderable object data; and transmit a control signal that causes the second set of renderable object data to be presented to the user via the user interface.

In some example implementations, the computer program product further includes program code instructions configured to parse the first set of menu data object information by: recognizing a first subset of menu data object information and a second subset of menu data object information; and storing the first subset of menu data object information separately from the second subset of menu data object information. In some such example implementations, and in other example implementations, the computer program product further includes program code instructions configured to: detect a relationship between a first portion and a second portion of the first set of parsed menu data object information; and store an indication of the relationship in the populated stratified data structure. In some such example implementations, and in other example implementations, flattening the populated stratified data structure to create the first set of renderable object data further comprises preserving the populated stratified data structure.

In some example implementations, the computer program product further includes program code instructions configured to receive input data via the user interface and store the input data in the populated stratified data structure. In some such example implementations, and in other example implementations, the computer program product further includes program code instructions configured to: traverse the stratified data structure to determine an override condition associated with the input data and transmit a control signal that causes an indication of the override condition to be rendered on the user interface.

In some example implementations, storing the first set of parsed menu data object information in a stratified data structure comprises populating an option group, wherein the option group is established at a top level of the stratified data structure.

In another example embodiment, a method for menu data object generation and control is provided, the method comprising: receiving a first set of menu data object information, wherein the first set of menu data object information comprises: a set of location data associated with a menu data object, an item identification, and a group identification; parsing the received first set of menu data object data information to generate a first set of parsed menu data object information; storing the first set of parsed menu data object information in a stratified data structure to create a populated stratified data structure, wherein the storing the first set of parsed menu data object information in the stratified data structure comprises populating an option group, wherein the option group is established at a top level of the stratified data structure; flattening the populated stratified data structure to create a first set of renderable object data; transmitting a control signal that causes the first set of renderable object data to be presented to a user via a user interface; receiving a second set of menu data object information, wherein the second set of menu data object information comprises a set of updated menu data object information; parsing the received second set of menu data objection information to generate a second set of parsed menu data object information; determining a difference between the first set of parsed menu data object information and the second set of parsed menu data object information; repopulating the populated stratified data structure based at least in part on the determined difference between the first set of parsed menu data object information and the second set of parsed menu data object information; creating a second set of renderable object data; and transmitting a control signal that causes the second set of renderable object data to be presented to the user via the user interface.

In some example implementations, parsing the first set of menu data object information comprises: recognizing a first subset of menu data object information and a second subset of menu data object information; and storing the first subset of menu data object information separately from the second subset of menu data object information. In some such example implementations, and in other example implementations, the method further comprises: detecting a relationship between a first portion and a second portion of the first set of parsed menu data object information; and storing an indication of the relationship in the populated stratified data structure.

In some example implementations, flattening the populated stratified data structure to create the first set of renderable object data further comprises preserving the populated stratified data structure. In some such example implementations, and in other example implementations, the method further includes receiving input data via the user interface and store the input data in the populated stratified data structure. In some such example implementations, and in other example implementations, the method further includes traversing the stratified data structure to determine an override condition associated with the input data and transmit a control signal that causes an indication of the override condition to be rendered on the user interface.

BRIEF DESCRIPTION OF THE DRAWINGS

Figure 1:
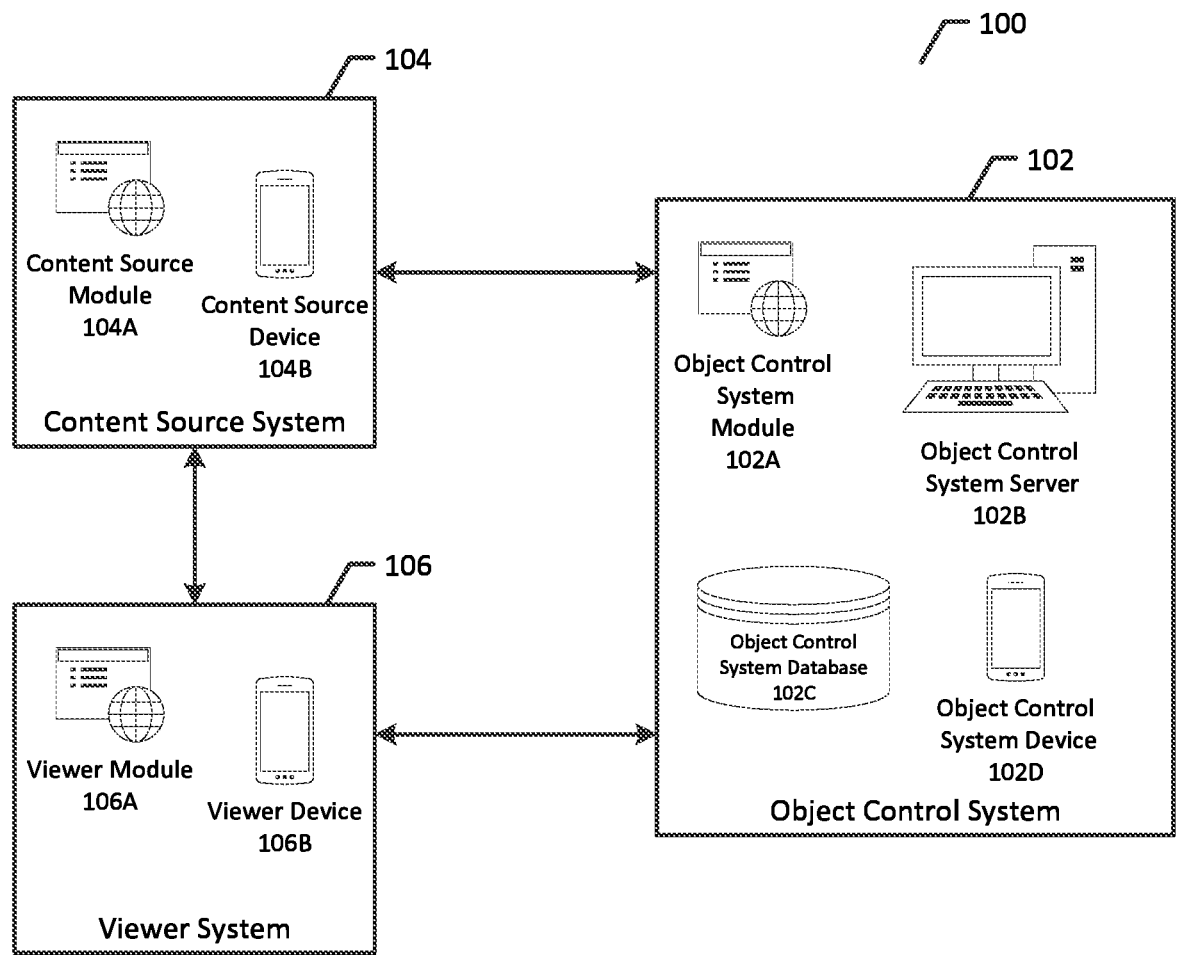
Figure 2:
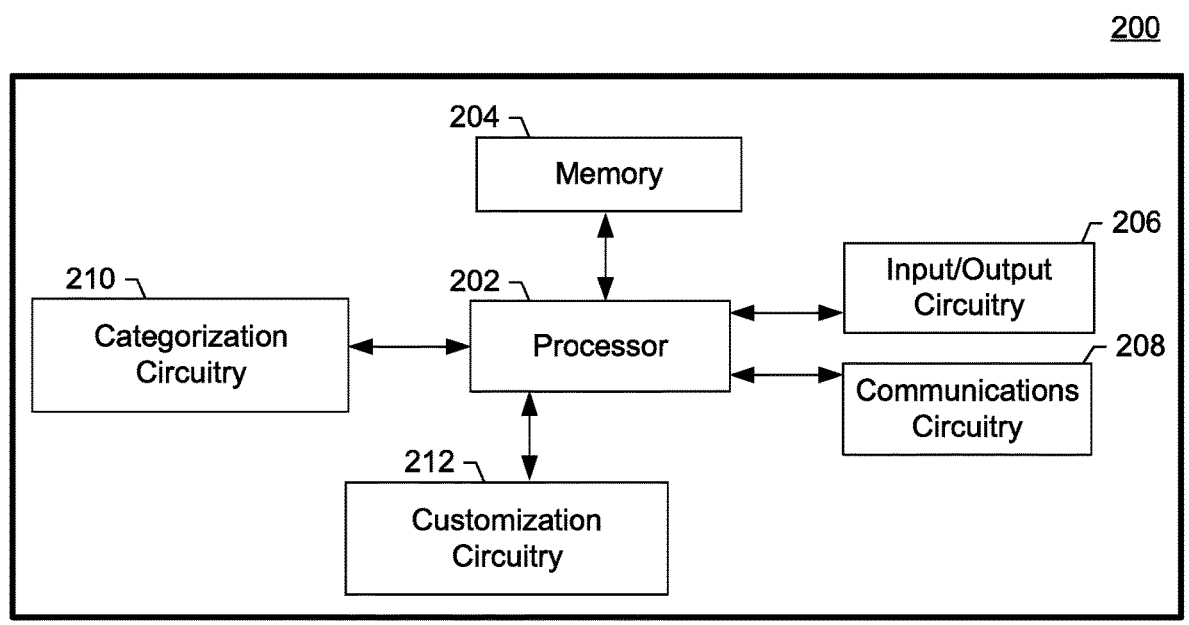
Figure 3:
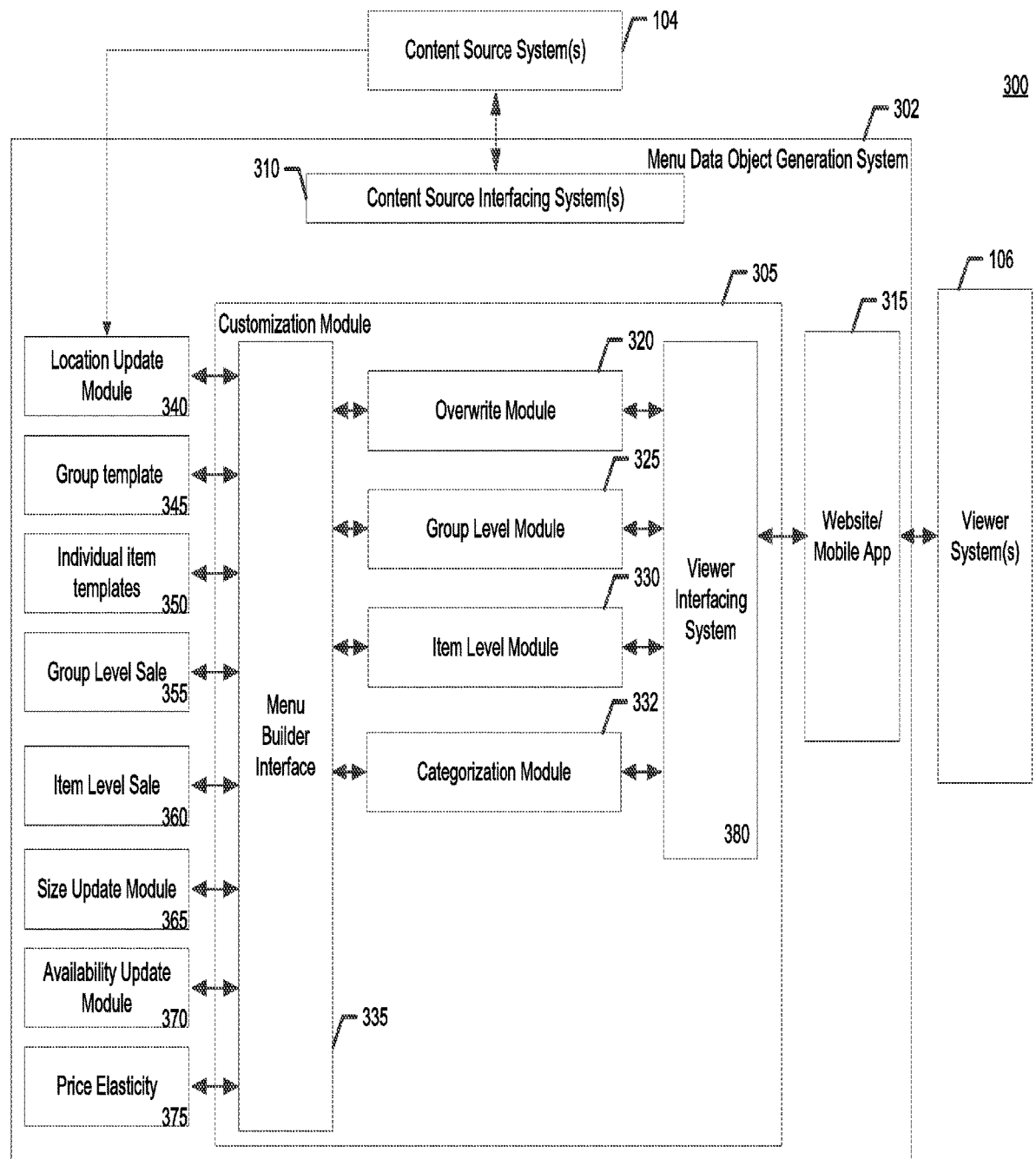
Figure 4:
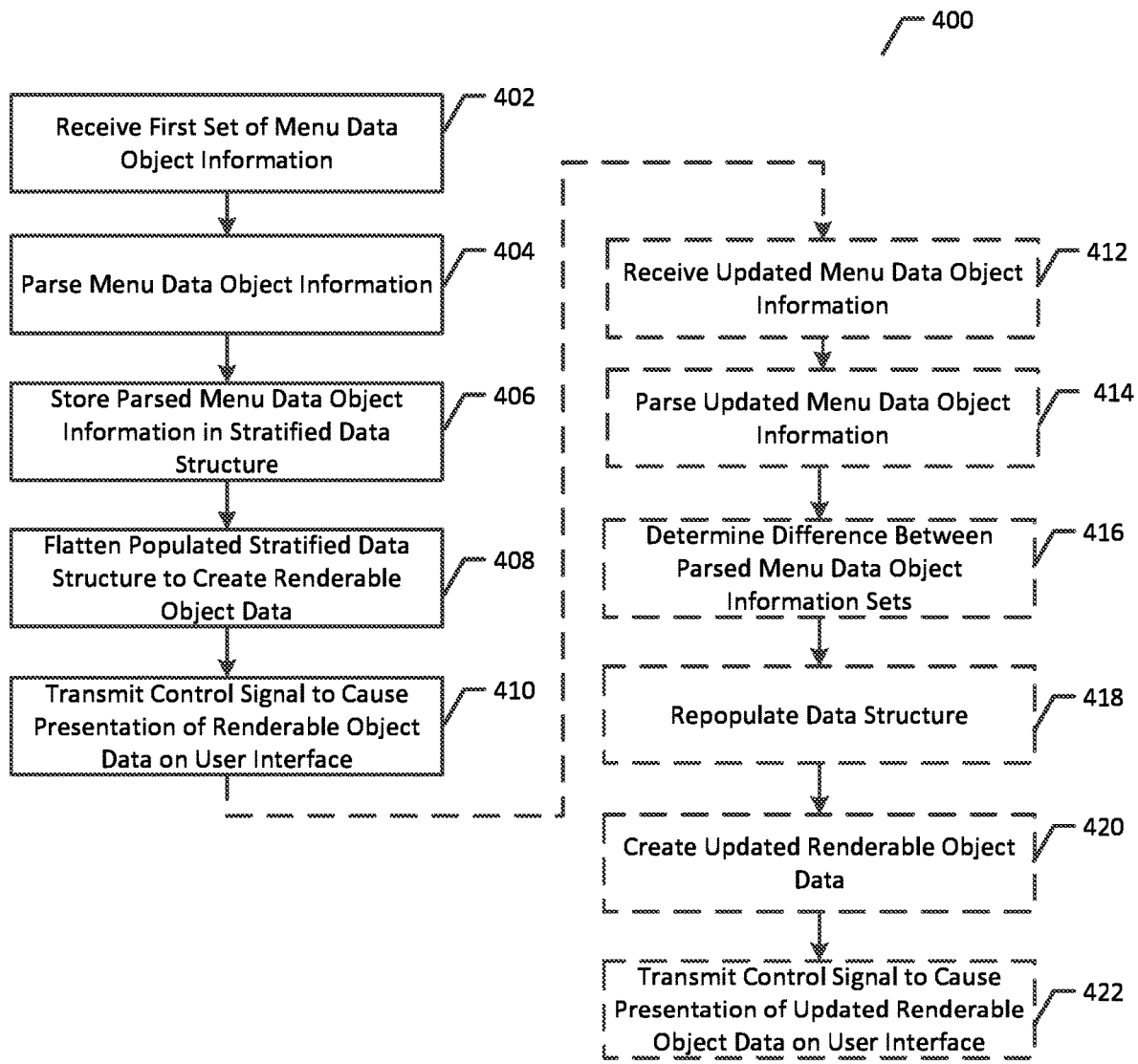
Figure 5:
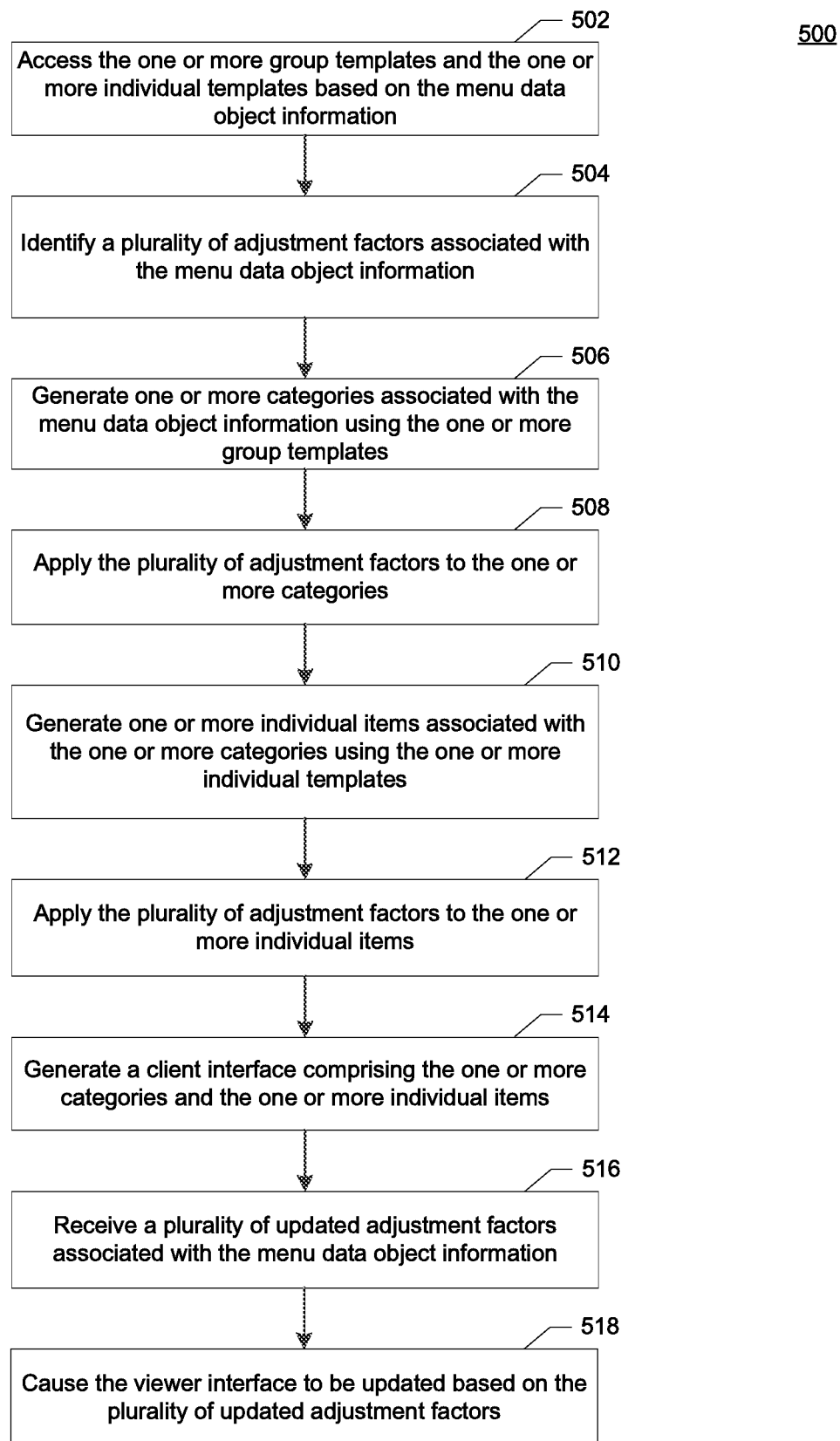
Figure 6:
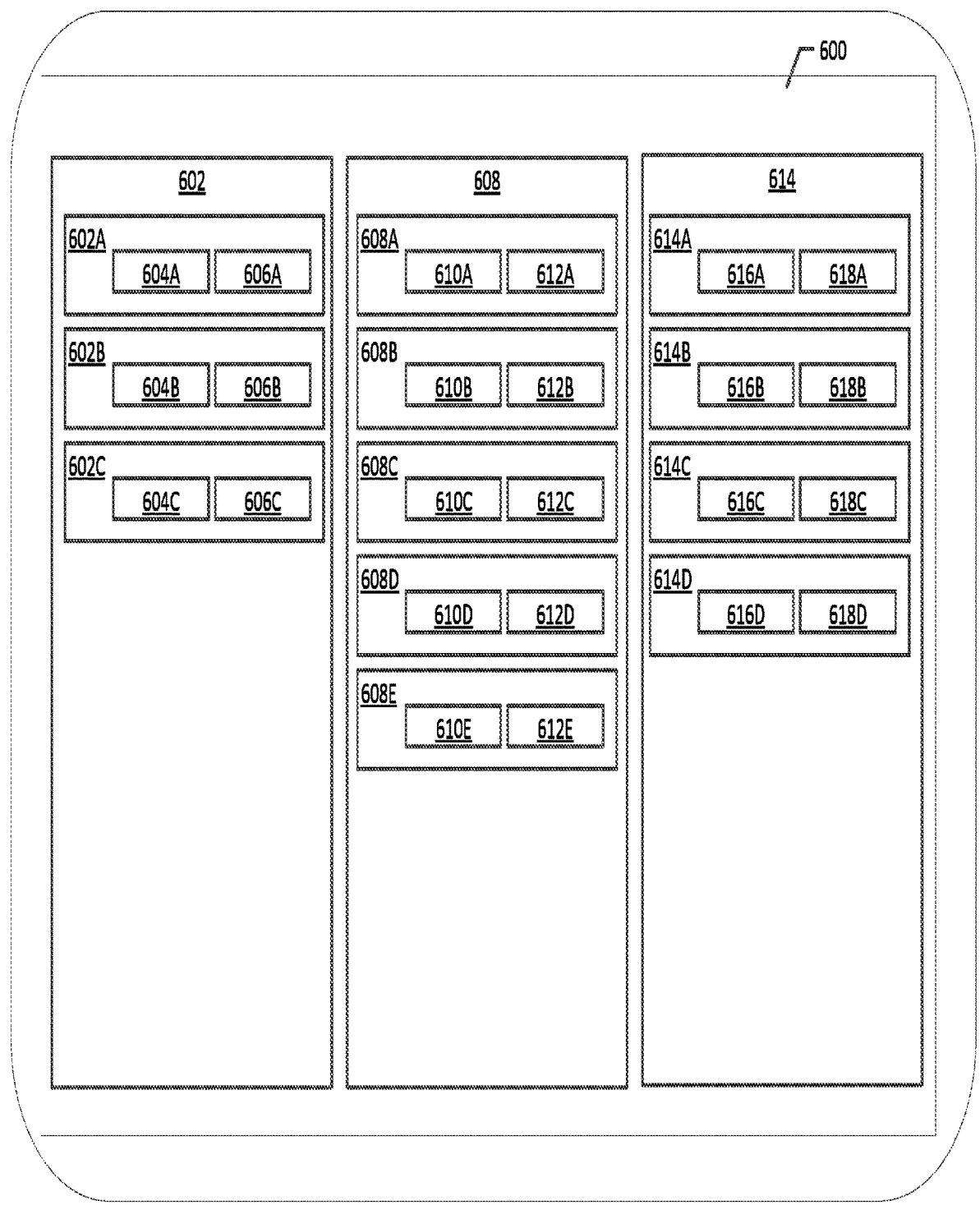

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a data object generation system using special-purpose circuitry in accordance with some embodiments of the present invention;

FIG. 3 illustrates an example data flow interaction between elements of an example device for generating menu data objects and interfaces associated with menu data objects in accordance with some embodiments of the present invention;

FIG. 4 illustrates a flowchart describing example operations for generating client interfaces associated with the data object data in accordance with some embodiments of the present invention;

FIG. 5 illustrates another flowchart describing example operations for generating client interfaces associated with the data object data in accordance with some embodiments of the present invention; and FIG. 6 illustrates an example diagram of a screen shot from an example user interface associated with a generated menu data object generation in accordance with some embodiments of the present invention;

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Various embodiments of the present invention are directed to improved apparatuses, methods, and computer readable media for generating and controlling menu data objects, which, in some implementations, involves the creation of one or more user interfaces associated with one or more menu data objects. In this regard, embodiments of the present invention provide systems, devices, and frameworks that employ characterization modeling to facilitate menu data object generation for multiple user interfaces. Using a characterization model, users associated with content sources and/or users associated with an object control system may utilize group templates and/or individualized templates to efficiently build similar but non-identical user interfaces. The system may inherit one or more group templates and override the one or more group templates to generate one or more categories for a specific user. In some example implementations, each group template may comprise one or more individual templates. The system may also inherit one or more individual templates and override the one or more individual templates to generate one or more individual data items for a specific user. Moreover, some example implementations involve the use and population of one or more stratified data structures that are capable of maintaining intra-data relationships during the flattening of the structure which may occur in the course of generating a user interface.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "client" and/or "content source" refers to an individual or entity that is a source, and/or is associated with sources, of content to be displayed in a menu data object. For example, a content source and/or client may be the owner and/or operator of a system that uses an interactive menu as part of a system interface and generates, acquires, and/or otherwise facilitates the acquisition of data to be included in a menu data object.

As used herein, the term "viewer" refers to an individual or other entity that views and/or otherwise interacts with a rendering of a menu on via a user interface, and by doing so, may interact with systems and/or other entities associated with a content source. Depending on the implementations of the particular systems associated with a viewer and/or a content source, a viewer may be able to make and communicate selections from a rendered menu via an interface directly and/or indirectly to a content source and/or other related system or entity.

As used herein, "menu data object" may include one or more electronic menu data sets or the like associated with one or more content sources. An "adjustment factor", as referenced herein, may include category availability, individual item availability, category visibility, individual item visibility, category available time period, or individual item available time period information associated with particular menu data items associated with a menu data set or otherwise associated with a menu data object. A "group template", as used herein, refers to and/or may include a category related to the one or data items associated with an electronic menu data set and can be utilized or inherited to generate customized category. An "individual template" may include individual items related to the one or more electronic menu data object and can be utilized or inherited to generate customized individual item. A "category" may include one or more individual items. In some implementations, the "group template" may include one or more individual templates. In some examples, at least one of the group templates and at least one of the categories may be the same. In some example implementations, at least one of the individual items and at least one of the individual templates may be the same.

Many of the example implementations described herein are particularly advantageous in situations and other contexts that involve the generation, control, and maintenance (such as updating, for example) menu-based interfaces require frequent adjustment, customization, and/or other updating. Some such example implementations, are also advantageous in situations and contexts that involve large, complex menu structures where many of the options and/or other information contained in the menu are similar, and/or the menu is structured such that there are multiple pathways through the menu to arrive at the same or similar set of options and/or information. It will be appreciated that some such situations and contexts arise in the context of online restaurant menus, where sets of options may be applicable to multiple menu items, changes are frequently required due to changes in inventory, changes in formulations, changes in pricing, and other factors that impact the availability of items and related options on a frequent basis. As such, and for purposes of clarity, some of the example implementations described herein use terms, background facts, and details that are associated with online restaurant menus. However, it will be appreciated that embodiments of the invention and example implementations thereof may be applicable and advantageous in a broad range of contexts and situations outside of those related to online restaurant menus.

Some example implementations described herein contemplate one or more stratified data structures and the population, repopulation, adjustment, traverse, and other use thereof. In example implementations involving one such stratified data structure, menu data object information is stored into separate sections to ensure consistency and prevent unnecessary changes to irrelevant parts of the data. Such storage in separate sections can be implemented using code similar to the following:

```
categories: {
  <categoryId>: {
    ...cat
  }
},
items: {
  <itemId>: {
    ...item
  }
},
optionGroups: {
  <optionGroupId>: {
    ...optionGroup
  }
}
```

In situations where one or more portions of the menu data object information are related, such information can be connected through the use of references and identifiers. For example, in an example situations where a "Lunch Menu" is a category, "Specials" associated with that lunch menu is a subcategory, and a "Burger Combo" is an item within the "Specials" subcategory, the information can be connected as follows:

```
categories: {
  11: {
    id: 11,
    name: "Lunch Menu"
  }
  25: {
    id: 25,
    name: "Specials",
    parent: 11
  }
  ...
}
items: {
  75: {
    id: 75,
    name: "Burger Combo",
    category: 25
  }
  ...
}
```

The use of a stratified data structure is particularly advantageous when such a structure permits overrides and inheritances between and amongst data elements within the structure to be determined. In implementations of some such structures this can be accomplished through the stratification of references and the establishment and/or existence of certain values. One such example implementation may take a form similar to the following:

```
categories: {
  11: {
    id: 11,
    name: "Lunch Menu",
    orderType: "DELIVERY_AND_TAKEOUT"
    // top level declares the value
  },
  25: {
    id: 25,
    name: "Specials",
    parent: 11,
    orderType: null
    // a null value declares inheritance
    // this subcategory's orderType:
    // "DELIVERY_AND_TAKEOUT"
  }
  ...
}
items: {
  75: {
    id: 75,
    name: "Burger Combo",
    category: 25
    orderType: "DELIVERY"
    // a value declares an override
    // this item's orderType:
    // "DELIVERY"
    // value is independent of parents
  }
  76: {
    id: 76,
    name: "Sub Combo",
    category: 25
    orderType: null
    // inherits from its parent
    // this item's orderType:
    // "DELIVERY_AND_TAKEOUT"
  }
  ...
}
```

When converted to renderable object to be displayed on a user interface, a flattened view of the inheritances and overrides is displayed, such that a user is only presented with the options and/or other information that are available. However, the stratified data structure is configured such that the strata are maintained intact, such that the location within the structure where overrides are established can always be identified. This can be expressed as follows:

| "DELIVERY_AND_TAKEOUT" > | null | > | null | > | "DELIVERY" | > | null |
|---|---|---|---|---|---|---|---|
| 0 | | 1 | | 2 | 3 | | 4 |

In such an expression, the actual value is null, while the display presented to the user shows the term "Delivery", as a result of an override at level 3, of the original value of "Delivery and Takeout".

Another particularly advantageous aspect of the stratified data structures used and otherwise contemplated herein is the use of option groups in connection with overrides. In some implementations, an option group may be established at a "master" or top level of the stratified data structure. In such implementations, an option group can be reused once and/or multiple times by a category and/or item within a menu. When reused, the same stratification for inheritances and overrides may be used to keep track of where a value originates and where a value is overridden. In such contexts, overrides are particularly important, because they can enable an operate of a control system associated with a menu data object and/or a related interface to reuse a single option group with slight variations in multiple places across multiple menu data objects. An example implementation of such an option group may be expressed as follows, which shows a master option group at the top of the structure, a reused version in category 10 with no other values provides, such that the category 10 inherits all values of the master option group, and a reused version in category 15, where the name of the option group is overridden to "Sandwich Dressings":

```
optionGroups: {
  7: {
    id: 7,
    name: "Salad Dressings",
    ...
  },
  ...
},
categories: {
  10: {
    id: 10,
    name: "Salads,
    optionGroups: [
      {
        optionGroupId: 7
      }
    ]
  },
  15: },
    id: 15,
    name: "Subs",
    optionGroups: [
      {
        optionGroupId: 7
        name: "Sandwich Dressings"
      }
    ]
  },
  ...
}
```

In some implementations of such a structure, each option group used with a particular category or item is given its own identification "id" separate from the identification of the master option group. Such implementations allow for multiple instances of the same option group to maintain the same ability to inherit and override elements. An example of such an implementation can be expressed as follows, where the same option group is used twice, and overridden differently in each case, such that one override changes a name element to "A Different Name", and another override changes a name element to "Another Name", while a subsequent use of the option group overrides a name element to be "Completely Different", and a subsequent use of the option group inherits the name "Another Name":

```
categories: {
  10: {
    id: 10,
    name: "Salads",
    optionGroups: [
      {
        optionGroupId: 7,
        id: 55,
        name: "A Different Name"
      },
      {
        optionGroupId: 7,
        id: 92,
        name: "Another Name"
      }
    ]
  },
  ...
}
items: {
  75: {
    id: 75,
    name: "Caesar Salad",
    category: 10
    optionGroups: [
      {
        optionGroupId: 7,
        id: 55,
        name: "Completely Different"
      },
      {
        optionGroupId: 7,
        id: 92
      }
    ]
  }
}
```

Turning now to the Figures, FIG. 1 shows an example system environment 100 in which implementations involving the efficient generation and control of menu data objects may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the creation of one or more menu data objects and one or more rendered user interfaces associated with a menu data object by receiving and parsing a set of menu object data information, storing the parsed information in a stratified data structure to form a populated stratified data structure, flattening the populated stratified data structure to form a set of renderable object data, and transmitting a control signal that causes the renderable object data to be presented to a viewer or other user via a viewable interface. Some such implementations contemplate the iterative receipt, parsing, storing, and otherwise processing of additional sets of menu data object information to provide for the efficient updating and control of interfaces associated with menu data objects. Some such embodiments leverage a hardware and software arrangement or environment for request data object-to-network response asset pairing in accordance with the present invention.

As shown in FIG. 1, an object control system 102 includes an online object control system module 102A which is configured to receive, process, transform, transmit, communicate with and evaluate menu data objects, content and other information associated therewith, and related interfaces via a web server, such as object control system server 102B and/or object control system device 102D. The object control system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, object control system 102 also includes an object control database 102C that may be used to store information associated with menu data objects, interfaces associated with such menu data objects, content source systems and/or content provided thereby or associated therewith, viewer systems and/or information provided thereby or associated therewith, and/or other information related to the generation and control of menu data objects and/or associated interfaces, which can be accessed by the object control system module 102A, the object control system server 102B, and/or the object control system device 102D. While FIG. 1 depicts object control system database 102C as a single structure, it will be appreciated that object control system database 102C may additionally or alternatively be implemented to allow for storage in a distributed fashion and/or at facilities that are physically remote from the each other and/or the other components of object control system 102. Object control system 102 is also shown as including object control system device 102D which may take the form of a laptop computer, desktop computer, or mobile device, for example, to provide an additional means (other than via a user interface of the object control system server 102B) to interface with the other components of object control system 102 and/or other components shown in or otherwise contemplated by system environment 100.

Menu data objects, menu data object information and/or additional content or other information to be associated with one or more menu data objects may originate from a content source system such as content source system 104. A user of content source system 104 may use a content source device 104B, such as a laptop computer, desktop computer, or mobile device, for example, to interface with a content source module 104A to menu data object information and/or information to be included in a menu data object, such as groups, categories, items, related templates, and/or other information to incorporate into and/or associate with a menu data object and otherwise processed by object control system 102. While only one content source system 104 is depicted in FIG. 1 in the interest of clarity, it will be appreciated that numerous other such systems may be present in system environment 100, permitting numerous content sources to develop and transmit content and other information associated with menu data object to object control system 102.

As shown in FIG. 1, system environment 100 also includes viewer system 106, which comprises a viewer module 106A and a viewer device 106B. While only one viewer system 106 is depicted in FIG. 1 in the interest of clarity, it will be appreciated that numerous additional such systems may be present in system environment 100, permitting numerous viewers to view and/or interact with interfaces associated with one or more menu data objects, and in some instances, communicate with the object control system 102 and/or one or more content source systems 104. viewer device 106B may comprise and/or incorporate a laptop computer, desktop computer, mobile device, or the like, for example, and is configured to interface with a viewer module 106A to interact with object control system 102 and/or one or more content source systems 104. The viewer system 106 is also capable of communicating with object control system 102 to provide information that the object control system 102 may need when determining whether and how to render one or more interfaces associated with a menu data object. For example, viewer system 106 may, such as via the capabilities of viewer device 106B ascertain the location of viewer system 106 through the use of a global positioning system (GPS) interface, cellular location protocols, and/or other location protocols.

Overall, and as depicted in system environment 100, object control system 102 engages in machine-to-machine communication with content source system 104 and viewer system 106, via one or more networks, to facilitate the processing of menu data object information received from content source system 104, the generation of renderable object data that can be transmitted to a viewer system 106, and the receipt of additional input data from the content source system 104 and/or viewer system 106, and the iterative updating of a menu data object and/or of the rendered interfaces associated therewith.

The object control system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, categorization circuitry 210, and customization circuitry 212. The apparatus 200 may be configured to execute any of the operations described herein, including but not limited to those described in connection with FIG. 1, FIG. 3, FIG. 4, FIG. 5 and FIG. 6.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include categorization circuitry 210. The categorization circuitry 210 includes hardware configured to maintain, manage, and provide access to a categorization database. The categorization circuitry 210 may provide an interface, such as an application programming interface (API), which allows other components of a system to obtain attributes of one or more group templates and one or more individual templates stored in the categorization database. For example, where items are particular products, services, or promotions such as prices, titles, names, discount levels, sizes, shapes, colors, locations, narrative descriptions, terms and conditions, or any other attributes of those products, services, or promotions. The categorization circuitry 210 may facilitate access to these attributes through the use of applications or APIs executed using a processor, such as the processor 202. However, it should also be appreciated that, in some embodiments, the categorization circuitry 210 may include a separate processor, specially configured field programmable gate array (FPGA), or application specific interface circuit (ASIC) to manage the offering of promotions via a promotion and marketing service. The categorization circuitry 210 may also provide interfaces allowing other components of the system to add or delete records to the categorization database, such as in the case of a new item being offered by a promotion within a certain time period, a price change of a category or an individual item, or in the case of an item no longer being available via communication with content source system 104, viewer system 106, or other similar systems, for example. The categorization circuitry 210 may communicate with other components of the system and/or external systems via a network interface provided by the communications circuitry 208. The categorization circuitry 210 may therefore be implemented using hardware components of the apparatus configured by either hardware or software for implementing these planned functions.

The customization circuitry 212 includes hardware configured to manage, store, process, and analyze a category and an individual item offered by a content source system. Because availability or inventory data may change in real-time as transactions occur, while item attributes may be static, it may be desirable to maintain an inventory database separate from the categorization database managed by the categorization circuitry 210 as described above. It should also be appreciated though, that in some embodiments the categorization circuitry 210 and the customization circuitry 212 may have similar and/or overlapping functionality. The inventory data may include records identifying particular category or particular item and availability for use as the subject of various transactions (e.g., purchase, sale, preorder). For example, the inventory data may include records identifying quantities of items located in particular restaurant, quantities in transit, expected delivery dates and times, or the like. The customization circuitry 212 may also provide access to historical inventory levels, such as rates of sale of particular category or particular item, transaction records indicating which items were purchased and when, and the like.

FIG. 3 is a block diagram showing an example data flow interaction between elements of an example device 300 for generating user interfaces associated with the menu data object information in accordance with some embodiments of the present invention. Menu data object generation system 302 comprises a content source interfacing system 310 for communicating with one or more content source systems 104 and a website/mobile app 315 for interfacing with one or more viewer system 106, both of which may be utilize or otherwise be embodied by input/output circuitry described with reference to FIG. 2, for example. The one or more viewer systems 106 and/or one or more content source systems 104 may provide a variety of electronic menu data object information to the menu data object generation system 302 for use in providing a customized viewer interface to a viewer via a viewer system 106. This electronic menu data object information may include, but is not limited to, location data, group template data, item template data, size selection data, price data, clickstream data, transaction data, and/or communication channel data.

Menu data object generation system 302 further comprises customization module 305. In communication with customization module 305, the menu data object generation system 302 further comprises location update module 340, group template module 345, individual item template module 350, group level sale module 355, item level sale module 360, size update module 365, availability update module 370, and price elasticity module 375, each of which may be configured to initiate menu data object generation. Such modules 340-375 described herein represent a portion of the modules that may be included in the customization module 305 and configured to initiate menu data object customization based at least in part on the particular content and/or other menu data object information that is provided by a content source system 104. The location update module 340 may be configured to access both group and individual item templates for a particular location and, in some example implementations, receive location information from a content source system 104. In some examples, a default set of group templates and individual item templates may be stored in the menu data object generation system 302 for a specific content source and can be customized from both group level and item level respectively. The default set of group and individual item templates may also be stored in the menu data object generation system 302 for different content sources within the same group level (e.g. Italian pizza or Chinese dumpling) or within the same item level (e.g. pepperoni or mushroom pizza toppings; pork or beef dumpling fillings) to facilitate efficient menu data object generation.

Moreover, customization module 305 further comprises overwrite module 320, group level module 325, item level module 330, and categorization module 332. The overwrite module 320 may be configured to initiate or otherwise start with an overwrite process at the group level or at the item level. For example, any size updates may change one or more categories at the group level and one or more item at the individual item level respectively. As shown in FIG. 3, the modules 340-375 that interact with information received from a content source system 104, along with the overwrite module 320, group level module 325, item level module 330, and categorization module 332 are configured to interface with the menu builder interface 335, which is capable of recognizing, parsing, combining, and otherwise processing information received form the various modules to build a menu data object. While in many implementations, the menu data object building accomplished by menu builder interface 335 may be completely automated, the menu builder interface 335 may also be able to receive input from an operator (not shown) who may make discrete and/or other particularized adjustments, such as in situations where a content source is not authorized or capable of directly interfacing with the menu data object generation system 302.

As shown in FIG. 3, customization module 305 also includes viewer interfacing system 380, which is capable of interacting with the website/mobile app 315 and the overwrite, group level, item level, and categorization modules 320-332 to generate one or more renderable objects that can be displayed on viewer system 106, and, in some implementations, receive input information from one or more viewer systems 106.

FIG. 4 is a block diagram illustrating a set of operations 400 performed, such as by the apparatus of FIG. 2 and/or menu data object generation system 302, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 4 and depicted or otherwise contemplated therein. Any of the other similar devices, such as menu data object generation system 302 are also so capable.

Many example implementations of the operations 400, the various devices capable of performing the operations 400 and/or other embodiments of the invention are particularly advantageous in contexts where systems rely on menus as a part of an interface with one or more viewers, wherein such menus are complex, interrelated, and/or require frequent updating and other adjustments. Such implementations are aimed at leveraging one or more stratified data structures to efficiently provide for such menu data objects, related interfaces, and the maintenance and control thereof.

As such, and as shown at block 402, the apparatus 200 is capable of receiving a set of menu data object information. Some example implementations of the operations 400 contemplate the receipt and processing of multiple sets of menu data object information and/or related content, such as from a content source. In some such example implementations, includes those discussed herein, it may be convenient, for the sake of clarity, to refer to the set of menu data object information that is received at block 402 as a "first" set of menu data object information. In some example implementations of block 402, the first set of menu data object information includes, but is not necessarily limited to, a set of location data associated with a menu data object, an item identification, and a group identification. The location data, in some example implementations, is data sufficient to identify a content source and/or a geographic location identified with that content source. In some example implementations, the item identification may include one or more pieces of data sufficient to identify an item that should be included as an entry in a menu. Likewise, a group identification may include one or more pieces of information sufficient to identify a group associated with the menu data object which may or may not be associated with the item identification. It will be appreciated that menu data object information may include any information that may be included in and/or associated with information included in a menu, such as category information, various template data, indications of options (such as sizes, configurations, an other aspects of items, for example), and any other such information referenced and/or otherwise contemplated herein.

As shown at block 404, the apparatus 200 is also capable of parsing the received first set of menu data object information to generate a first set of parsed menu data object information. In some example implementations of block 404, the menu data object information may arrive in any of a number of formats that must be parsed to identify and/or extract the desired menu object data that can be subsequently translated and/or reformatted into a different structure. As such, and particularly in contexts where the menu object data information arrives as natural language text, a set of verbal information, a datastream, or in a non-stratified data structure, parsing the menu object information permits the apparatus and/or other system performing block 404 to identify and separate distinct data elements and/or other portions of the menu data object information. In some example implementations of block 404, parsing the first set of menu data object information includes recognizing a first subset of menu data object information and a second subset of menu data object information and storing the first subset of menu data object information separately form the second subset of menu data object information. In some such example implementations, portions menu data object information may be tagged, structured, and/or otherwise identified such that separate portions of the information can be identified and divided. In some example implementations, such as example implementations involving the various modules presented in FIG. 3, for example, different types of menu data object information may be detectable by one or more modules and marked and/or otherwise divided for separate storage.

As shown at block 406, the apparatus 200 is also capable of storing the first set of parsed menu data object information in a stratified data structure to create a populated stratified data structure. Any of the stratified data structures described, referenced, and/or otherwise contemplated herein may be used in example implementations of block 406, and may be populated in accordance with any of the protocols that may be used with such stratified data structures. In some example implementations of block 406, the apparatus is able to detect a relationship between a first portion and a second portion of the first set of parsed menu data object information and store an indication of the relationship in the populated stratified data structure. In some such example implementations, there may be a hierarchical relationship between the portions, such that the first portion is indicative of a data element, such as an item identification, that is included within a class identified by the second data element, such as an indication of a category. However, it will be appreciated that any relationship between two portions of set of data may be identified and marked, such as indications that the data portions are associated with a particular location, both within a particular category or group, or the like, for example. In some example implementations, storing the first set of parsed menu data object information in a stratified data structure comprises populating an option group, wherein the option group is established at a top level of the stratified data structure. Any of the approaches to establishing an option group described, referenced, and/or otherwise contemplated herein may be used in such example implementations.

As shown at block 408, the apparatus 200 is also capable of flattening the populated stratified data structure to create a first set of renderable object data. In some example implementations of block 408, a renderable object may not be able to use, recognize, and/or process the full structure of the populated stratified data structure, particularly in contexts where the stratified data structure includes indications of inheritances and overrides, such as those discussed elsewhere herein. As such, example implementations of block 408 contemplate, for example, traversing the populated stratified data structure and identifying the values and/or other entries for the specific items or elements that are to be displayed in a menu interface associated with the menu data object information and the related renderable object information. Some particularly advantageous implementation contemplate flattening the populated stratified data structure in a manner that includes preserving the populated stratified data structure. In some such example implementations, this may be accomplished by processing the populated stratified data structure in a manner that copies and/or detects the elements to be rendered and creating a flattened version of the populated stratified data structure. However, any approach to translating, transforming and/or otherwise reconfiguring a stratified data structure without permanently destroying the stratification established therein may be used in such example implementations.

As shown at block 410, the apparatus 200 is also capable of transmitting a control signal that causes the first set of renderable object data to be presented to a user via a user interface. In some example implementations, the user interface may be presented on the screen of a viewer's mobile device, such as viewer system device 106B. However, it will be understood that the renderable object data may be presented via any of a number of interfaces. For example, an operator of the object control system 102 may be presented a view via a display on object control system device, and/or another system component that can present visual images to a user.

With reference to blocks 414-422, the apparatus 200 may optionally be configured to perform additional steps, including but not limited to the optional operations shown in dashed lines in FIG. 4.

As shown at block 412, the apparatus is optionally capable of receiving a second set of menu data object information, wherein the second set of menu data object information comprises a set of updated menu data object information. As discussed above, some example implementations of the operations 400, the apparatus 200, and other devices, systems, and methods contemplated herein are advantageous in situations where a menu requires periodic and/or frequent updating to reflect changes in content, such as content provided by a content source 104. In example implementations that arise in such situations, it may be advantageous to perform block 412 to receive such updated menu data information, which can reflect any adjustment, alteration, addition, subtraction, and/or other modification of any aspect of a menu data object and/or its related menu data object information. Any approach that may be used in connection with receiving menu data object information in block 402 may be used in implementations of block 412.

As shown at block 414, the apparatus is optionally capable of parsing the received second set of menu data object information to generate a second set of parsed menu object information. It will be appreciated that any approach to parsing the first set of menu data object information that may be used in connection with block 404 may be used in connection with block 414.

As shown at block 416, the apparatus is optionally capable of determining a difference between the first set of parsed menu data object information and the second set of parsed menu data object information. As noted elsewhere herein, the second set of menu data object information includes an updated set of menu data object information. In some such implementations, it may be particularly advantageous and/or efficient to identify the specific data elements and/or other information that differs between the first set of menu data object information and second set of menu data object information. In some such example implementations, the apparatus 200, through the operation of processor 202 or the like, compares the two sets of menu data object information to ascertain the differences between the two data sets, to permit further processing that is focused solely and/or primarily on the changed data, as opposed to the entire universe of menu data object information.

As shown at block 418, the processor 200 is optionally capable of repopulating the populated stratified data structure based at least in part on the determined difference between the first set of parsed menu data object information and the second set of parsed menu data object information. In some example implementations of block 418, it may be particularly advantageous, where the specific differences between the first and second sets of parsed menu data object information have been identified, to replace in the stratified data structure only the changed data. However, it will be appreciated that any approach to populating and/or repopulating a data structure may be used, including those used and/or contemplated in connection with implementations of block 406, for example.

As shown in block 420, the processor 200 is optionally capable of creating a second set of renderable object data. In implementations of block 420 that arise in contexts where menu information is updated and/or otherwise changed, it may be advantageous to create renderable object data that are indicative of, reflect, or are otherwise associated with the changed menu data object information. It will be appreciated that any of the approaches to creating renderable object data used in connection with block 408 may be used in connection with implementations of block 420.

As shown in block 422, the processor 200 is optionally capable of transmitting a control signal that causes the second set of renderable object data to be presented to the user via the user interface. It will be appreciated that any approach to causing data to be presented via a user interface may be used in connection with implementations of block 422, including the approaches used and/or otherwise contemplated in connection with implementations of block 410, for example.

Some example implementations of the operations 400 contemplate situations where user input in the form of input data may be received by an apparatus or other device and via a user interface. Such input data may then be stored in the stratified data structure. In some such situations, this may include configuring the apparatus 200 to traverse the stratified data structure to determine an override condition associated with the input and transmit a control signal that causes an indication of the override condition to be rendered on the user interface. In some such example implementations, one or more operators of an object control system may be tasked with and/or otherwise responsible for entering changes associated with updates and/or other modifications associated with a menu data object through the use of an interface. In such example implementations, it may be advantageous to cause menu items and/or other elements of a displayed menu, to be highlighted, such as through a change of color or appearance, on an interface displayed to such an operator, so that the operator can, for example, verify that the changes made to the menu object information and/or related data structure will have the desired effect on the overall menu data object and any related displays.

FIG. 5 illustrates an example of a process 500 for generating viewer interfaces associated with the menu data object information in accordance with embodiments of the present invention. The process 500 may be performed by components of menu data object generation system 302 as described above with respect to FIG. 3, the apparatus 200, and/or any of the other structures described and/or contemplated herein. The process 500 may gather item attributes from a categorization database and employ the customization model to generate a menu data object associated with a particular content source and/or viewer at particular time periods.

As shown in FIG. 5, process 500 begins at block 502 when menu data object information is received, such as from a content source system 110. At block 502, one or more group templates and one or more individual templates may be retrieved based on the received menu data object information as part of the menu data object generation process, or internally selected and stored, such as by the customization module 305. The menu data object information may comprise index information associated with a group level database or an item level database, such as an index relates to a data object categorization database. In an example implementation, one or more categories and one or more individual items may be accessed, edited or removed by a keyword search, wherein the keyword is associated with the one or more categories or with one or more individual items.

As shown at block 504, process 500 includes identify a plurality of adjustment factors associated with the menu data object information. For example, the plurality of adjustment factors may comprise category availability, individual item availability, category visibility, individual item visibility, category available time period, and/or individual item available time period.

As shown at block 506, process 500 also includes generating one or more categories associated with the menu data object information using one or more group templates. In some example implementations of block 506, the one or more categories may comprise at least one category different from the one or more group templates.

As shown at block 508, the process 500 also includes applying the plurality of adjustment factors to one or more categories. In an example implementation, the plurality of adjustment factors may include location information, category availability information, category visibility information, and/or a category availability time period, each of which may reflect and/or otherwise be associated with parameters and/or limitations that govern the conditions and/or situations under which items, categories, and/or other elements of a menu may be presented as options and/or other information to a viewer.

As shown at block 510, process 500 also includes using one or more individual templates to generate one or more individual items associated with the one or more categories. For example, in one example implementation, the one or more individual items may comprise at least one individual item different from the one or more individual templates.

As shown at block 512, process 500 also includes applying the plurality of adjustment factors to one or more individual items. In some example implementations of block 512, the plurality of adjustment factors may include location information, category availability information, category visibility information, and/or a category availability time period, each of which may reflect and/or otherwise be associated with parameters and/or limitations that govern the conditions and/or situations under which items, categories, and/or other elements of a menu may be presented as options and/or other information to a viewer.

As shown at block 514, process 500 also includes generating a viewer interface that includes one or more categories and one or more related individual items. In example implementations of block 514, a menu that incorporates the category and item information is rendered on a user device associated with a viewer, such as on a viewer's mobile device.

As shown at block 516, block 516, a plurality of updated adjustment factors associated with the menu object data is received. Implementations of block 516 contemplate updating and otherwise adjusting a menu based on a set of adjustment factors. The set of adjustment factors may include, in some instances, indicia of information (such as categories, items, and/or option groups) that should be added, removed, or otherwise reconfigured in the menu. In some example implementations, the adjustment factors may include a set of rules and/or conditions that are meant to be used to change the menu. For example, the adjustment factors may include a set of rules that indicate that some menu items (and/or categories or options associated therewith) are available only in certain locations, at certain times, or in certain quantities.

As shown at block 518, the process 500 includes updating the interfaced based on the plurality of updated adjustment factors. For example, the data object identifier may be employed to perform a lookup on a menu data object characterization database to identify and update various categories and individual items associated with the menu data object information.

Some example implementations contemplate an item inventory prediction that may be generated in connection with a menu data object, such that the menu data object may associate or specify a category or item with the prediction for use by the client interfacing system. In one such example implementation, a rate of selection of a category or an item may be determined and applied to a current inventory of the category or the item held by a content source and/or a related system to determine the amount of time before the category or the item becomes used up and/or otherwise unavailable at the current rate. For example, the customization model may note the times of selection so as to detect that there is a spike in viewer selection activity (e.g., category or item selection and/or views) at a particular time and in a particular location and/or geographic area (e.g., San Francisco), and such features may be used as inputs or as one or more adjustment factors to the menu data object generation system for a regression analysis to update the customization model.

FIG. 6 illustrates an example diagram of a screen shot from an example user interface 600 associated with a generated menu data object in accordance with some embodiments of the present invention. Many particularly advantageous implementations of embodiments of the invention, some of which relate to the user interface 600, arise in the context of menus accessed and used by individuals to remotely select, configure, and order food items from a restaurant as part of seeking a delivery of food items to or on behalf of the user. As such, some of the examples presented herein include details that are directed to such contexts. However, it will be appreciated that such details are presented herein for the purpose of clarity and to otherwise facilitate the understanding of some of the concepts and aspects of the invention disclosed herein, and are not intended to confine the invention or any embodiments thereof to any single context or situations.

As shown in FIG. 6, the interface 600 includes a first set of selectable menu elements 602A-602C, each of which includes a set of menu element information 604 and a set of selectable control elements 606. In example implementations of the interface 600 that is presented to a viewer who may wish to use the menu presented to access information, register selections, and/or interface with a content source and/or a system associated with a content source, the first set of selectable menu elements 602A-602C may present a list of categories into which additional menu elements are divided and/or otherwise grouped. For example, in the case of menu interface associated with an online system for ordering food from a restaurant, the categories listed may, for example, represent the various portions of a menu, such as appetizers, entrees, desserts, drinks, and/or other categories into which items may be grouped.

In some example implementations of interface 600, the menu element information 604 may include, but is not limited to information presented in text, graphic, and/or other visual form that provides information about the particular selectable menu element 602. For example, menu element information 604 may include a name of the category, an indication of how many items or other elements are within the category, indications about services (such as delivery, takeout, and/or other services) that may be associated with the category, an indication of the availability of the category and/or other items or elements contained therein, and any other information about the category.

In some example implementations of interface 600, the set of selectable elements 606 may include one or more "buttons" or other regions of the interface that a user may select to trigger a further action of the interface. For example, a user may press or otherwise provide an indication to the selectable control element 606 that causes the items associated with the particular selectable menu element 602 to be presented on the user interface 600.

In the example implementation shown in FIG. 6, upon selecting one of the selectable menu elements 602, such a 602A, for example, a second set of selectable menu elements 608A-608E are rendered on the interface 600. In some example implementations of interface 600, the second set of selectable menu elements 608A-608E may be associated with the particular items that are contained within the category that is associated with element 602A. As shown in FIG. 6, each of the second set of selectable menu elements 608A-608E includes a set of menu element information 610 and a set of selectable control elements 612.

As with the menu element information 604 described herein, the menu element information 610 for each given element 608 may include, but is not limited to information presented in text, graphic, and/or other visual form that provides information about the particular selectable menu element 608. For example, menu element information 610 may include a name of the item, a description of the item, an indication of a price associated with the item, indications about services (such as delivery, takeout, and/or other services) that may be available for the item, an indication of the availability of the item and/or other items or elements contained therein, and any other information about the item. As with the selectable control elements 606A-C, each of selectable control elements 612A-E may include one or more "buttons" or other regions of the interface that a user may select to trigger a further action of the interface. For example, a user may press or otherwise provide an indication to the selectable control element 612 that causes a group associated with the particular selectable menu element 608 to be presented on the user interface 600. In some example implementations, the selectable control element may include a field in which a user may be able to enter a quantity of the particular item that the user wishes to acquire, and a button that, when selected, purchases and/or directs the user to a portal through which they can purchase the selected item.

In the example implementation shown in FIG. 6, upon selecting one of the selectable menu elements 608, such a 608A, for example, a third set of selectable menu elements 614A-614D are rendered on the interface 600. In some example implementations of interface 600, the third set of selectable menu elements 614A-614D may be associated with elements of a group, such as a group of options, which may be applied to the particular items that is associated with element 608A. As shown in FIG. 6, each of the third set of selectable menu elements 608A-608E includes a set of menu element information 616 and a set of selectable control elements 618.

As with the menu element information 604 and 608 described herein, the menu element information 610 for each given element 608 may include, but is not limited to information presented in text, graphic, and/or other visual form that provides information about the particular selectable menu element 614. For example, menu element information 614 may include a name of the group element, a description of the element within the group, an indication of a price associated with the element, indications about adjustable aspects of a the related items (such as size, toppings, condiments, sides, temperature, spicing, and other adjustable factors of the related item, for example), indications about services (such as delivery, takeout, and/or other services) that may be available for the group element, an indication of the availability of the group element and/or any other information about the group element.

As with the selectable control elements 606A-C, and 612A-612E each of selectable control elements 618A-D may include one or more "buttons" or other regions of the interface that a user may select to trigger a further action of the interface. For example, a user may press or otherwise provide an indication to the selectable control element 612 that causes an option to be associated with an instance of an item (such as, applying a group element that represents a topping to be applied to an instance of an item, such as a pizza or burger, for example). In some example implementations, the selectable control element 612 may include a field in which a user may be able to enter a quantity of the particular item that the user wishes to acquire, and a button that, when selected, purchases and/or directs the user to a portal through which they can purchase the selected item.

Some example implementations of interface 600 arise in contexts where an operator may make adjustments to the interface 600 and/or the underlying data structure, menu data object information and/or menu data object. In some such example implementations, the selectable control elements 606A-C, 612A-E and 618A-D may include three buttons, which allow the user to selectively duplicate an element (i.e., copy an element, such as a category, item, and/or group for use in connection with another portion of the interface and/or another interface), remove an element from the interface (which may, for example result in the deletion and/or removal of any related information from the data structure associated with the element and/or the menu data object and related information associated with the element), and/or edit an element (which may, for example, allow the user to enter and/or import information that changes the aspects of the element, such as labels, associations, information associated with the element, and the like). In some example implementations, selecting any of the duplicate, remove, and/or edit buttons may cause particularized interfaces to be superimposed on the interface 600 that allow the user to confirm their selection and/or enter or otherwise import information to be used in editing or altering an element.

In some such example implementations, that involve the editing and/or other control of the interface 600, one or more of the elements 602A-B, 608A-E, and 614A-D, and any portions thereof, may be rendered in a different color to reflect changes made during the editing process. For example, when an alteration is made to one element, other elements that are related through to that altered element (such as through an inheritance and/or override condition or status) may be rendered and/or highlighted, such that a user who is making alterations to the interface (and its underlying data) may be able to confirm that the entered changes have the desired effect.

As described above, FIGS. 4 and 5 illustrate flowcharts of an apparatus, such as apparatus 200, a method, and a computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory, the memory comprising instructions that configure the apparatus to:
   receive, from a content source, menu data object information associated with a menu data object;
   generate, based on the menu data object information, one or more individual items associated with the content source and one or more categories;
   determine one or more individual templates associated with the menu data object based on the menu data object information;
   generate a first viewer interface that depicts the one or more categories and, for each category of the one or more categories, one or more related individual items of the one or more individual items that are associated with the category;
   receive, from a viewer, a selection of a depiction on the first viewer interface;
   receive a plurality of adjustment factors associated with the menu data object, wherein the plurality of adjustment factors were determined by a customization model based at least on the selection; and
   update the first viewer interface based on the plurality of adjustment factors to generate an updated viewer interface.

2. The apparatus of claim 1, wherein the plurality of adjustment factors were determined by the customization model based on a prediction about at least one of the one or more individual items or the one or more categories.

3. The apparatus of claim 1, wherein the instructions that configure the apparatus to generate the one or more individual items comprise instructions that configure the apparatus to:
   determine one or more individual templates associated with the menu data object based on the menu data object information; and
   determine one or more initial individual items based on the one or more individual templates.

4. The apparatus of claim 3, wherein the instructions that configure the apparatus to determine the one or more individual templates associated with the menu data object based on the menu data object information comprise instructions that configure the apparatus to perform a targeted keyword search within the menu data object information.

5. The apparatus of claim 1, wherein the instructions that configure the apparatus to generate the one or more categories comprise instructions that configure the apparatus to:
   determine one or more group templates associated with the menu data object based on the menu data object information; and
   determine one or more initial categories based on the one or more group templates.

6. The apparatus of claim 5, wherein the instructions that configure the apparatus to determine the one or more group templates associated with the menu data object based on the menu data object information comprise instructions that configure the apparatus to perform a targeted keyword search within the menu data object information.

7. The apparatus of claim 1, wherein the plurality of adjustment factors comprise at least one of a location-based adjustment factor, a category-visibility-score-based adjustment factor, and a category-availability-period-based adjustment factor.

8. A computer-implemented method comprising:
   receiving, from a content source, menu data object information associated with a menu data object;

generating, based on the menu data object information, one or more individual items associated with the content source and one or more categories;

generating a first viewer interface that depicts the one or more categories and, for each category of the one or more categories, one or more related individual items of the one or more individual items that are associated with the category;

receiving, from a viewer, a selection of a depiction on the first viewer interface;

receiving a plurality of adjustment factors associated with the menu data object, wherein the plurality of adjustment factors were determined by a customization model based at least on the selection; and updating the first viewer interface based on the plurality of adjustment factors to generate an updated viewer interface.

9. The computer-implemented method of claim 8, wherein the plurality of updated adjustment factors were determined by the customization model based on a prediction about at least one of the one or more individual items or the one or more categories.

10. The computer-implemented method of claim 8, wherein generating the one or more individual items comprises:

determining one or more individual templates associated with the menu data object based on the menu data object information;

determining one or more initial individual items based on the one or more individual templates; and applying the plurality of adjustment factors to the one or more initial individual items to generate the one or more individual items.

11. The computer-implemented method of claim 10, wherein determining the one or more individual templates associated with the menu data object based on the menu data object information comprises performing a targeted keyword search within the menu data object information to extract the one or more individual templates.

12. The computer-implemented method of claim 8, wherein generating the one or more categories comprises:

determining one or more group templates associated with the menu data object based on the menu data object information;

determining one or more initial categories based on the one or more group templates; and applying the plurality of adjustment factors to the one or more initial categories to generate the one or more categories.

13. The computer-implemented method of claim 12, wherein determining the one or more group templates associated with the menu data object based on the menu data object information comprises performing a targeted keyword search within the menu data object information to extract the one or more group templates.

14. The computer-implemented method of claim 8, wherein the plurality of adjustment factors comprise at least one of a location-based adjustment factor, a category-visibility-score-based adjustment factor, and a category-availability-period-based adjustment factor.

15. A computer program product comprising at least one non-transitory computer-readable storage medium having computer-readable program code portions stored therein, the computer-readable program code portions configured to:

receive, from a content source, menu data object information associated with a menu data object;

determine one or more individual templates associated with the menu data object based on the menu data object information;

generate, based on the menu data object information, one or more individual items associated with the content source and one or more categories;

generate a first viewer interface that depicts the one or more categories and, for each category of the one or more categories, one or more related individual items of the one or more individual items that are associated with the category;

receive, from a viewer, a selection of a depiction on the first viewer interface;

receive a plurality of adjustment factors associated with the menu data object, wherein the plurality of adjustment factors were determined by a customization model based at least on the selection; and update the first viewer interface based on the plurality of adjustment factors to generate an updated viewer interface.

16. The computer program product of claim 15, wherein the plurality of updated adjustment factors were determined by the customization model based on a prediction about at least one of the one or more individual items or the one or more categories.

17. The computer program product of claim 15, wherein the computer-readable program code portions configured to generate the one or more individual items associated with the content source and one or more categories comprise computer-readable program code portions configured to:

determine one or more individual templates associated with the menu data object based on the menu data object information; and determine one or more initial individual items based on the one or more individual templates.

18. The computer program product of claim 17, wherein the computer-readable program code portions configured to determine the one or more individual templates associated with the menu data object based on the menu data object information comprise computer-readable program code portions configured to perform a targeted keyword search within the menu data object information.

19. The computer program product of claim 15, wherein the computer-readable program code portions configured to generate the one or more categories comprise computer-readable program code portions configured to:

determine one or more group templates associated with the menu data object based on the menu data object information; and determine one or more initial categories based on the one or more group templates.

20. The computer program product of claim 19, wherein the computer-readable program code portions configured to determine the one or more group templates associated with the menu data object based on the menu data object information computer-readable program code portions configured to perform a targeted keyword search within the menu data object information to extract the one or more group templates.

* * * * *